United States Patent [19]

Rickenbacker

[11] 4,276,619

[45] Jun. 30, 1981

[54] IMPEDANCE AND COMMON MODE REJECTION TESTING OF A MULTI-CHANNEL SEISMIC DATA GATHERING APPARATUS

[75] Inventor: James E. Rickenbacker, Houston, Tex.

[73] Assignee: Exxon Production Research Company, Houston, Tex.

[21] Appl. No.: 17,999

[22] Filed: Mar. 7, 1979

[51] Int. Cl.³ ............... G01V 1/16; G01C 27/00
[52] U.S. Cl. ............................ 367/13; 324/51; 364/482; 73/100 DV
[58] Field of Search ............... 324/51, 73 AT, 73 R, 324/54, 57; 179/175.3 F, 15 BF; 364/421, 482, 550; 367/13; 340/514, 516, 652; 73/1 D, 1 DV

[56] References Cited

U.S. PATENT DOCUMENTS

| | | | |
|---|---|---|---|
| 3,135,951 | 6/1964 | Byrne | 340/509 |
| 3,360,617 | 12/1967 | Munson | 179/175.3 F |
| 3,468,164 | 9/1969 | Sutherland | 340/509 |
| 3,944,969 | 3/1976 | Arai et al. | 340/516 |
| 3,978,476 | 8/1976 | Tanigawa | 340/514 |
| 4,001,540 | 1/1977 | Drake et al. | 364/482 |
| 4,039,806 | 8/1977 | Frederiksson et al. | 328/14 |
| 4,043,175 | 8/1977 | Frederiksson et al. | 73/1 DV |
| 4,052,694 | 10/1977 | Frederiksson | 367/177 |
| 4,134,099 | 1/1979 | Lankford | 367/76 |
| 4,155,080 | 5/1979 | Kovacs | 324/51 |
| 4,160,228 | 7/1979 | Hix | 367/13 |
| 4,166,243 | 8/1979 | West et al. | 340/652 |
| 4,184,143 | 1/1980 | Stafford | 367/13 |

FOREIGN PATENT DOCUMENTS 2715842 4/1977 Fed. Rep. of Germany ........... 364/482

OTHER PUBLICATIONS

Covey, "Digital System Checks Acoustic Underwater Transducers", 12/65, Undersea Technology.
White, "Cozy: Accurate Automatic . . . Components," 5/75, pp. 227–233, Bell Laboratories Record, vol. 53, #5.

*Primary Examiner*—Nelson Moskowitz
*Attorney, Agent, or Firm*—George E. Glober, Jr.

[57] ABSTRACT

This relates to testing the impedance and common mode rejection characteristics of multi-channel seismic data gathering apparatuses. The apparatus embodying the invention includes a signal recording and computing system with a plurality of input channels; a plurality of geophone channels, each with a high wire and a low wire; a high bus and a low bus; a plurality of reference impedances; and a signal generator with two output terminals. Each geophone channel comprises one or more geophones which are connected by the wires to the input channels of the recording and computing system. Additionally, the high wire of each channel is connected through a reference impedance to the high bus and the low wire of each channel is connected through a reference impedance to the low bus. The apparatus also includes switching means for selectively controlling the connections between the buses, the generator and ground. For gathering seismic data, a first setting of the switching means connects both buses to ground and disconnects both buses from the generator. A second setting for testing the impedances of the geophone channels disconnects the buses from ground and connects them to the generator so that a known test signal is applied to the geophone channels simultaneously and the voltage developed across the wires of each channel is measured and used as a basis for computing the impedance of each channel. A third setting for measuring the common mode rejection of each channel disconnects both buses from ground and connects them to one of the terminals of the generator and connects the other terminal of the generator to ground. The voltage developed across each pair of wires under these conditions is a measure of the common mode rejection of the geophone channels.

3 Claims, 5 Drawing Figures

IMPEDANCE AND COMMON MODE REJECTION TESTING OF A MULTI-CHANNEL SEISMIC DATA GATHERING APPARATUS

BACKGROUND OF THE INVENTION

1. Field of the Invention

This invention relates to seismic data gathering devices or apparatuses. More particularly, it relates to testing the impedances and common mode rejections of geophone channels of such apparatuses. This invention is applicable to apparatuses for gathering seismic data on land, as well as to marine seismic data gathering apparatuses. However, for clarity the description herein will be directed primarily to land seismic data gathering apparatuses, with the understanding that the invention is not limited to land applications.

2. Description of the Prior Art

A land seismic data gathering apparatus comprises a plurality of geophone channels and a multi-channel signal recording and digital computing system which typically is mounted on a truck, and may be referred to simply as a recording and computing system. Each geophone channel includes one or more geophones and a plurality of wires connecting the geophones to the recording and computing system. Typically each channel includes two wires, which may be referred to as the high wire and low wire, respectively. Each wire has two ends, which may be referred to for convenience as the near end and the far end, respectively. With the recording and computing system as a reference point, the near end of each wire is connected to the recording and computing system and the geophones are connected to the wires at their far ends or at points between the two ends. The geophones detect vibrations in the earth and generate electric signals representative of such vibrations. The signals re transmitted by the wires to the recording and computing system for recordation and processing.

The accuracy and ease of interpretation of the seismic data gathered by the recording and computing system depends to a great extent on whether the impedances and common mode rejections of each of the geophone channels remain reasonably constant. Under normal conditions, the impedance of each geophone channel varies primarily with the length of its wires and with the condition of the geophones and their connections to the wires. The common mode rejection of each geophone channel varies primarily with the leakage from the wires to the earth. The leakage is to a great extent influenced by moisture on the earth. Therefore, the impedance and the common mode rejection of each geophone channel should be tested periodically between shots.

A commonly practiced method for making such impedance tests involves using complex switching means together with a resistance meter or ohmmeter. The geophone channels are tested seriatim by individually measuring the resistance across each channel with a resistance meter. The switching means are used to connect and disconnect each geophone channel to and from the recording and computing system and to and from the resistance meter according to the channel to be tested. See, for example, U.S. Pat. No. 2,917,706 (1959) to Thompson and FIG. 1 and the accompanying description below.

Other proposed geophone channel impedance testing methods employ a response test wherein switching means are used first for disconnecting the geophone channels from the recording and computing system and then for connecting the channels to a signal generator which simultaneously transmits a test signal to all the channels. Thereafter, the geophone channels are reconnected to the recording and computing system which simultaneously records the response signals of all the geophone channels. See, for example, U.S. Pat. No. 3,858,169 (1974) to Bardeen. See also U.S. Pat. No. 3,717,810 (1973) to Spanbauer which proposes driving the geophone channels with a constant RMS voltage or current and deriving the impedance from a measurement of the RMS value of the other of the voltage or current. Another proposed system involves impressing AC and DC currents of predetermined amplitudes on said geophone channels and detecting the excess of peak voltage produced by the AC current over the DC voltage generated by the DC current. See U.S. Pat. No. 4,052,694 (1977) to Fredriksson.

In the known prior art, the common mode rejection of the geophone channels has not been measured directly, but has been measured indirectly by use of an ammeter to measure leakage to the earth for each channel.

In a modern seismic data gathering apparatus up to several hundred geophone channels may be employed. Because all known prior art methods for measuring geophone channel impedance and common mode rejection involve at least one switch for each channel, therefore, a large number of switches are required. These switches are relatively expensive and are subject to failure under adverse field conditions. Further, the testing of the geophone channels seriatim, for those systems which require such a procedure, can be quite time consuming, particularly if one or more switches must be repaired. Such delays can be quite expensive, because the task of gathering seismic data is halted while such tests are being conducted.

SUMMARY OF THE INVENTION

Briefly, applicant solves this problem by permanently interconnecting the high wires of each geophone channel, by permanently interconnecting the low wires of each geophone channel, by selectively applying a test signal of known amplitude substantially simultaneously to all of the geophone channels and by using the voltages developed by the test signal across the channels to compute the impedances and common mode rejections of the geophone channels, as will be described. The permanent interconnections of the wires remove the need for the large number of switches or relays customarily employed in the prior art.

The apparatus for testing the condition of each geophone channel comprises a signal generator for generating a test signal, a high bus, a low bus, a plurality of reference resistors, and a switching means for selectively controlling the connections between the buses, the generator, and ground. Reference resistors are connected permanently to the high bus and to the near ends of the high wires of the geophone channels. Similar reference resistors are connected permanently to the low bus and to the near ends of the low wires of the geophone channels. The generator has a high output terminal and a low output terminal and preferably generates a periodic signal with a known amplitude.

For normal seismic data gathering operation, the high bus and the low bus are connected through the switching means to ground and are disconnected from the generator, so that the normal transmission of seismic data from the geophones to the recording and computing system is uninterrupted.

For testing the impedances of the geophone channels, the switching means disconnects the buses from ground and connects them to the output terminals of the signal generator which produces a test signal of known amplitude. The test signal is applied substantially simultaneously to all the geophone channels. The resulting voltages developed across the geophone channels are recorded and stored in the recording and computing system. Since the amplitude of the test signal and the values of the reference resistors are known, the recording and computing system by use of Ohm's law can very rapidly compute the actual impedance of each geophone channel. The computed impendances then are compared with the corresponding nominal impedances of the geophone channels to determine whether the geophone channels are in appropriate condition for gathering seismic data.

For the common mode rejection test, the switching means disconnects the buses from ground and connects the high bus and the low bus to one output terminal of the signal generator while its other output terminal is grounded. In this manner, the same test signal will be applied to both the high and low wires of all the geophone channels. Any imbalance in a channel's condition, such as that resulting from leakage, will manifest itself as a voltage signal developed across the geophone channel. This signal will be recorded by and stored in the recording and computing system. The stored voltages are processed and compared to determine whether the geophone channels are in appropriate condition for gathering seismic data.

DETAILED DESCRIPTION OF THE PREFERRED EMBODIMENT

Figure 1:
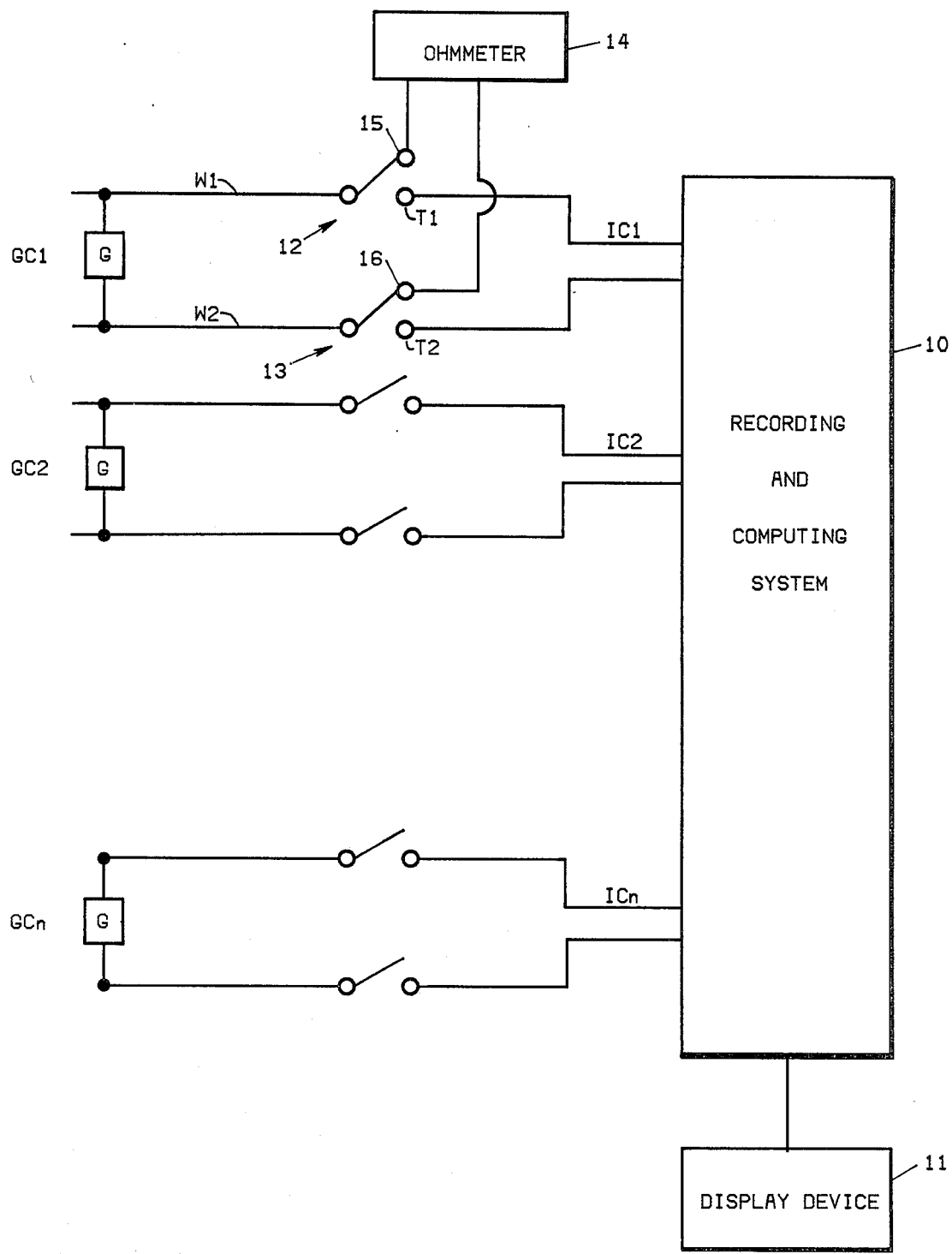
FIG. 1 is a schematic representation in block diagram form of a typical prior art seismic data gathering apparatus including switching devices for each geophone channel for connecting and disconnecting the geophone channel wires to and from the recording and computing system.

The invention will be better understood when viewed with reference to a typical prior art seismic data gathering apparatus illustrated in FIG. 1. This appartus comprises a plurality of geophone channels GC1, GC2 . . . GCn. As is well known in the art, each geophone channel includes a pair of wires W1 and W2 and a plurality of geophones G suitably connected to wires W1 and W2. For clarity, wires W1 will be considered to be the high wires and wires W2 will be considered to be the low wires. The geophones when properly coupled to the earth detect earth vibrations and produce corresponding electric signals representative of the detected vibrations.

Each geophone channel produces a signal which is recorded, stored and processed by a multi-channel signal recording and computing system 10, which has a plurality of input channels IC1, IC2 . . . ICn, each with a pair of input terminals T1 and T2 for each geophone channel. System 10 may be referred to simply as a recording and computing system and may be any special or general purpose computer suitable for seismic applications. System 10 preferably of course is a digital computer. Such systems are well known in the art and may be obtained from Texas Instruments in Dallas, Tex. from Geospace Corporation in Houston, Tex., and from others. Typically such computers include components for amplifying the signals received from the geophone channels, converting them to digital form, and recording, storing and processing them in accordance with a suitable software program. The processed signals can be reconverted back into analog form for display on a suitable system display terminal or other plotter or display device 11. As is shown in FIG. 1, switching devices 12 and 13 are provided for selectively connecting wires W1 and W2 to input terminals T1 and T2 and to an ohmmeter 14 which is provided for measuring the impedances of the geophone channels, as will be described.

Current practice in the field calls for using up to several hundred geophone channels, with each channel comprising from one to several hundred geophones. The geophones are manually disposed on the earth by technicians who move the geophone wires and plant each geophone in the earth at a desired location. Such handling of the geophone wires and of the individual geophones may damage the insulation and the wires, as well as the parts within the geophones. Accordingly, it is desirable frequently to test the impedance of each geophone channel for the purpose of locating defective wires and geophones. A defective channel produces no signal or a distorted signal and, when such signal is added in later processing to the signals of the non-defective channels, the overall signals become distorted. Such distortions can seriously impair the accuracy of the gathered seismic data.

Each geophone channel has a known nominal impedance which is a function primarily of its number of geophones G and of the length of its wires W1 and W2. Further, each channel has a predetermined tolerance range of acceptable variation from the nominal impedance. It is desirable to determine either the channel's absolute impedance or the variation of the geophone channel impedance from its nominal value. If the measured impedance falls outside the tolerance range, then the seismic crew is alerted to the possibility of a faulty geophone, such as one with a defective coil, a short between a coil and the geophone's metallic housing, an open or shorted geophone wire, or the like. Such faults should be located and corrected before the primary task of gathering seismic data is continued.

Ohmmeter 14 with input terminals 15 and 16 is provided for the purpose of measuring the impedances of geophone channels GC1, GC2 . . . GCn seriatim. Switching devices 12 and 13 are used to connect wires W1 and W2 to the ohmmeter input terminals 15 and 16, as is illustrated for channel GC1 in FIG. 1. Switching devices 12 and 13 typically might be double-pole, double-throw reed relays or equivalent devices. This prior art technique is workable, but making such consecutive impedance tests on all the geophone channels requires a considerable amount of time, during which the recording and computing system 10 is down, as is heretofore mentioned. Also, the readings must be interpreted for each geophone channel, because the nominal impedance of each channel is a function of the length of its wires and other factors. Further, such switching devices are relatively expensive and frequently break down under the adverse environmental conditions typically encountered during geophysical prospecting.

Figure 2:
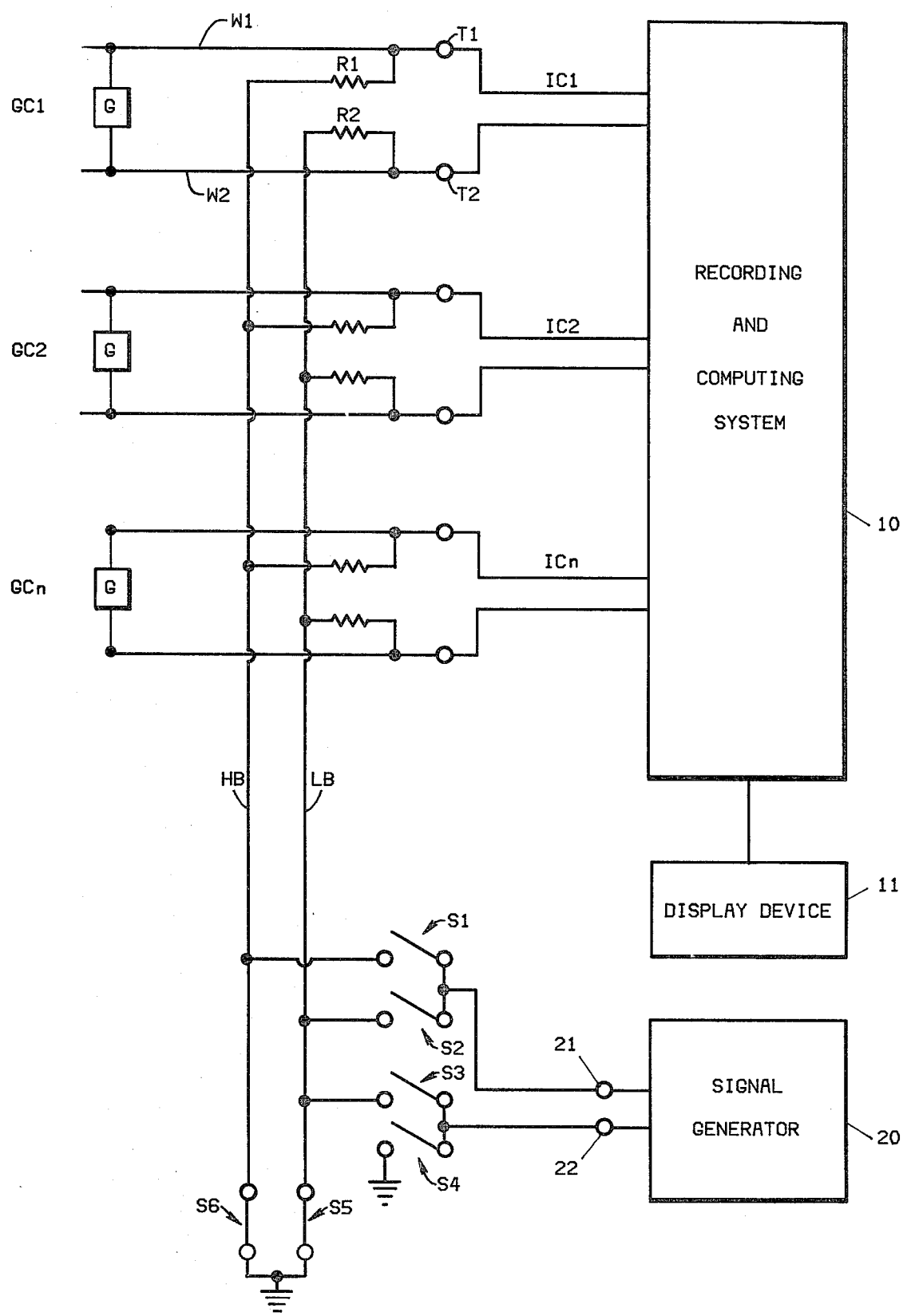
FIG. 2 is a schematic representation of a seismic data gathering apparatus embodying the present invention.

FIG. 2 illustrates the preferred embodiment of this invention. As in FIG. 1, a series of geophone channels GC1, GC2 . . . GCn is shown, each having a pair of wires: a high wire W1 and a low wire W2. As was explained above, each wire has a near end and a far end. One or more geophones G are connected to the far ends of each pair of wires or to the wires at points between their two ends. The near ends of each pair of wires are connected to one of the input channels IC1, IC2 . . . ICn of the recording and computing system 10. Thus, the geophone channels are connected to distinct input channels in the sense that each geophone channel is connected to only one input channel and each input channel is connected to only one geophone channel.

The geophone channels do not include any switching devices for use in measuring the impedances or common mode rejections of the channels. Instead, a pair of known impedances is employed for each geophone channel. Preferably these impedances are reference resistors R1 and R2. These resistors are connected to the wires of the geophone channels and to a high bus HB and a low bus LB, as shown. Preferably, the resistance values of resistors R1 and R2 are substantially equal so that each channel is balanced relative to ground. The resistors serve a dual function. They help maintain substantially constant input impedance across input terminals T1 and T2 for the seismic frequency range of operation, which is usually between about 5 hertz and about 120 hertz, and they provide a known source impedance during the geophone channel impedance and common mode rejection tests. Each resistor R1 is connected permanently to the near end of a high wire W1 and to the high bus HB, and each resistor R2 is connected permanently to the near end of a low wire W2 and to the low bus LB. For seismic data gathering apparatuses now in use, a typical value of such resistors might be 5,000 ohms plus or minus one percent. Such resistors are inexpensive compared to the cost of the switching devices 11 and 12 described in connection with FIG. 1.

A signal generator 20 with a high output terminal 21 and a low output terminal 22 is provided. The output terminals of signal generator 20 are connected to the high bus HB and to the low bus LB and to earth or ground through a relatively simple switching means which includes switches S1 through S6. See FIGS. 2, 3 and 5. The switching means enables the operator to check the geophone channels' impedances and their common mode rejections. Switches S1 and S2, when closed, connect the high output terminal 21 respectively to the high bus HB and to the low bus LB. Switches S3 and S4, when closed, connect the low output terminal 22 respectively to the low bus LB and to ground. Switches S5 and S6, when closed, connect buses HB and LB, respectively, to ground.

During normal seismic data gathering, switches S5 and S6 connect the high and low buses HB and LB to ground and switches S1, S2, S3 and S4 are open, as is illustrated in FIG. 2. As is well known to those skilled in the art, such an arrangement suppresses noise and the build-up of a static charge on the wires.

Figure 3:
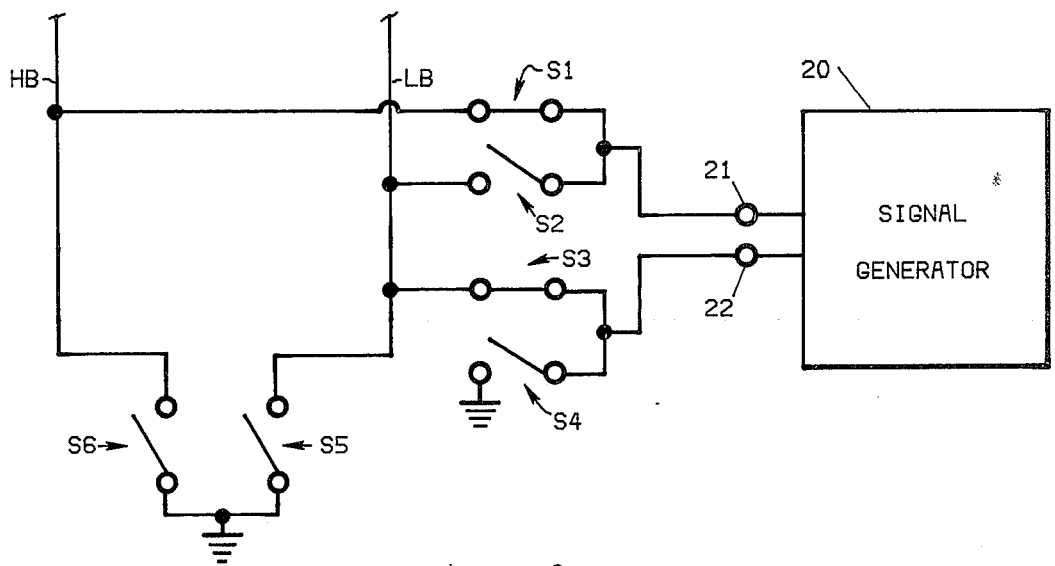
FIG. 3 is a schematic representation illustrating the manner of performing an impedance test on the geophone channels with the apparatus of FIG. 2.

FIG. 3 illustrates the position of the switches for the geophone channel impedance test. Switches S2, S4, S5 and S6 are open and switches S1 and S3 are closed, so that the buses are disconnected from ground, the high output terminal 21 is connected to the high bus and the low output terminal 22 is connected to the low bus. Alternatively, the high output terminal could be connected to the low bus and the low output terminal could be connected to the high bus. The signal generator 20 develops an alternating current signal, preferably a known periodic signal with a known amplitude (VG). This signal is applied substantially simultaneously to all the geophone channels GC1 . . . GCn through their respective resistors R1 and R2. The resulting voltages developed by the geophone channels are measured and stored in the recording and computing system 10 in a manner similar to the measuring and recording of the voltages developed by the geophone channels in response to the seismic earth vibrations. From these measured voltages, the known source voltage (VG), and the known source impedances (R1 and R2), the actual impedance of each geophone channel can be readily calculated using Ohm's law. System 10 carries out the necessary computations.

Previously, for each channel a determination will have been made of the nominal impedance of that channel and of the acceptable tolerance range of impedances within which the actual impedance might fall and still be acceptable even if it is not precisely the same as the nominal impedance. These nominal impedances and the tolerance ranges for each geophone channel will have been recorded in the system 10. After calculating the actual impedance for each geophone channel, system 10 compares the actual impedance with the nominal impedance. This comparision may take the form of a direct comparison between the actual and nominal impedance, or may take the form of a determination whether the actual impedance is within the tolerance range for that channel, or may take the form of a determination of the percentage variation of the actual impedance from the nominal impedance, or may take any other form suitable for assisting the seismic crew in determining whether the channel in question is ready to gather more seismic data. The actual impedances, nominal impedances, percentage variations, and indications of whether the actual impedances fall within the acceptable tolerance range can then be displayed visually on the system terminal or other display device for use by the seismic crew. For simplicity, a simple go or no-go signal for each channel indicating whether the impedance falls within the acceptable tolerance range might be displayed.

Figure 4:
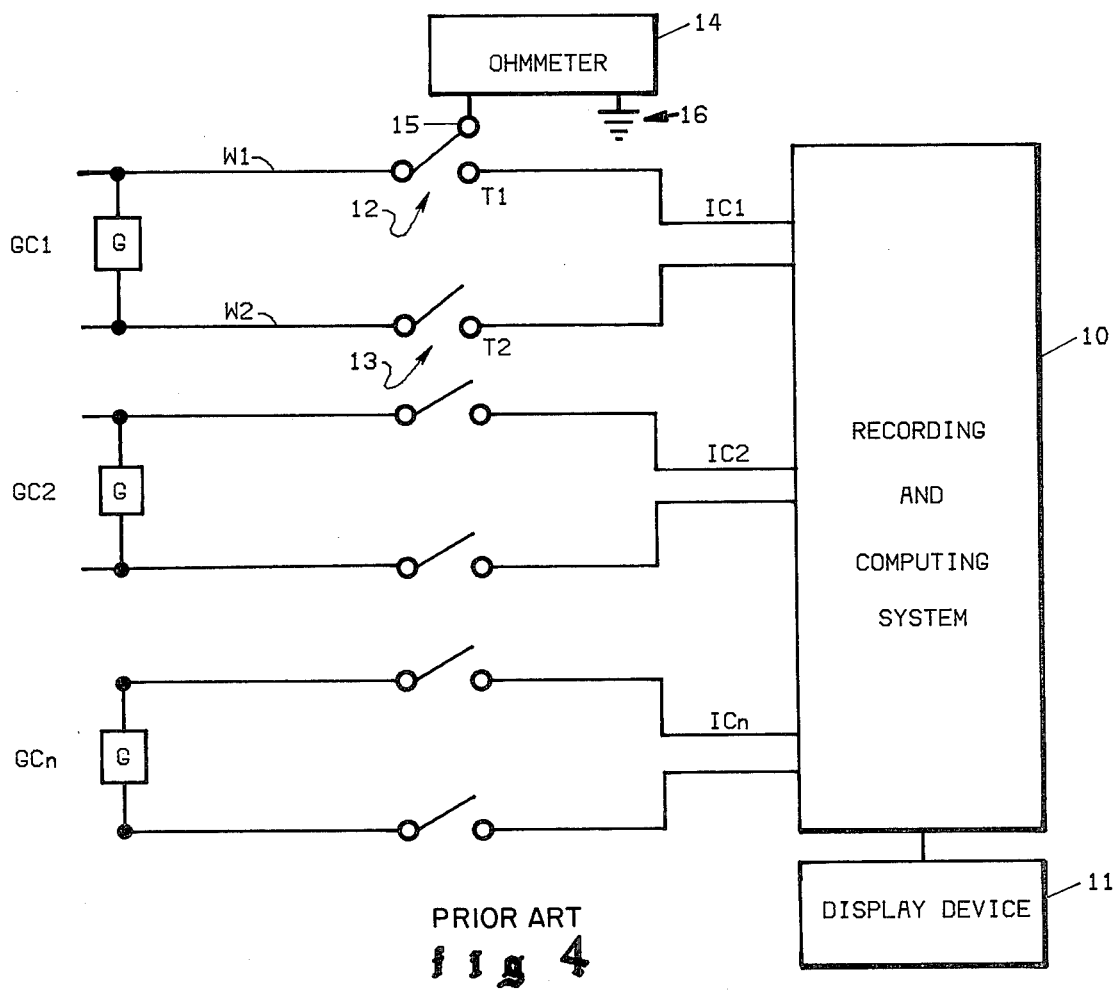
FIG. 4 is a schematic representation illustrating a typical prior art method for testing leakage to ground of the geophone channels.

FIG. 4 shows the conventional method for testing leakage to the earth of a string of geophones. Geophone wire W1 is connected by switch 12 to terminal 15 of ohmmeter 14. Ohmmeter terminal 16 is connected to ground. The ohmmeter measures the geophone channel resistance to ground, which ideally is infinite. This conventional method is subject to substantially the same disadvantages as the conventional method for measuring the geophone channel impedances discussed above and illustrated in FIG. 1.

Figure 5:
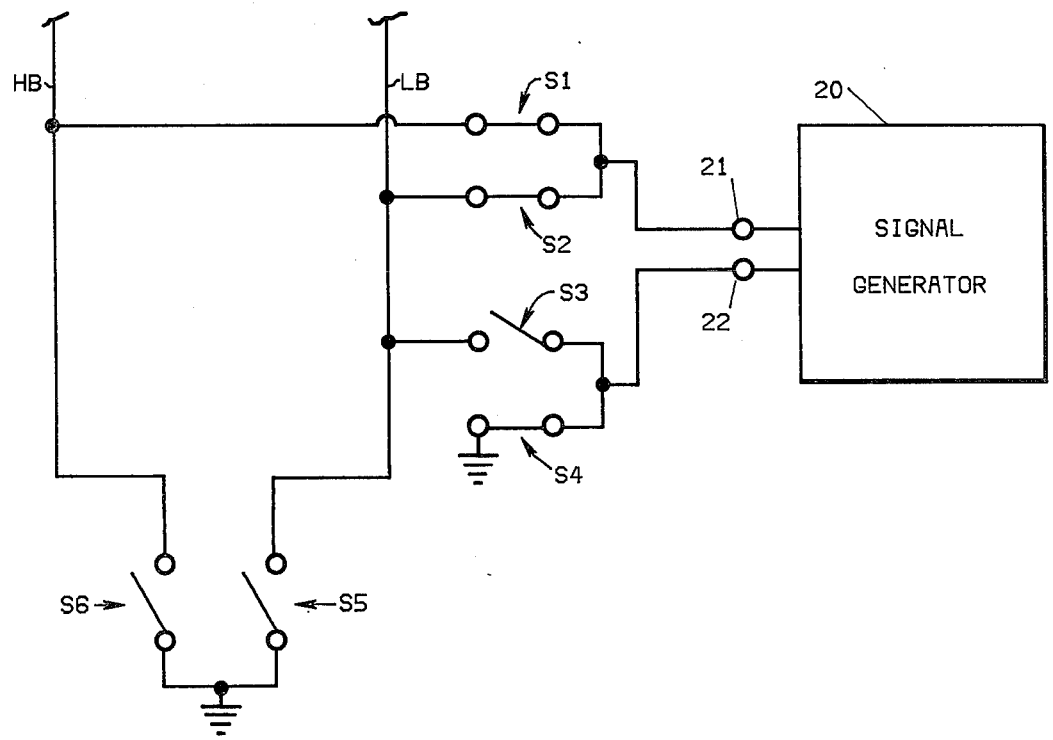
FIG. 5 is a schematic representation illustrating the manner of performing a common mode rejection test on the geophone channels with the apparatus of FIG. 2.

FIG. 5 illustrates the setting of the switches for testing the common mode rejections of the geophone channels in accordance with the invention illustrated in FIG.

2. Switches S1 and S2 are closed so that the high output terminal 21 of signal generator 20 is connected to both the high bus HB and the low bus LB. Switch S4 is closed to connect the low output terminal 22 to ground. The other switches are open.

The common mode rejection of a geophone channel may be defined as the voltage applied between the pair of wires and ground divided by the voltage developed across the pair of wires under those circumstances. Common mode rejection is a measure of how well the geophone channel wire pair ignores noise which enters both wires simultaneously. Focusing on channel GC1, if no resistance of leakage to ground exists from either geophone wire W1 or W2, or if the same leakage resisitance exists from either wire to ground, then no voltage will be developed across the geophone wires W1 and W2. In that event, the common mode rejection is infinite and the channel is said to be perfectly balanced. On the other hand, for an imperfectly balanced channel, as is normally the case, the common mode rejection is finite.

The voltages developed across each of the geophone channels GC1 through GCn, as a result of the application of the test signal of known amplitude between ground and the high and low buses HB and LB tied together, are recorded by the recording and computing system 10. Based on this information, system 10 computes and displays on the system terminal or other display device the common mode rejection of each channel. Alternatively, if the amplitude of the test signal remains reasonably constant from one test to another, then the voltages developed across the geophone channels can be used by the seismic crews as indications of the common mode rejection of the channels. Alternatively, as with the impedance information, a simple go or no-go signal for each channel indicating whether the common mode rejection of that channel is at or above an acceptable minimum level can be displayed on the display device. The seismic crew refers to this display in determining whether the channels are in satisfactory condition to gather more seismic data.

Thus, from the foregoing, it may be appreciated that switches S1 through S6 and their associated wiring constitute a switching means for selectively controlling the connections between the buses, to the generator and ground. The switching means has a first setting for transmitting the seismic signals developed by the geophones to the recording and computing system; this first setting connects both buses to ground and disconnects them from the generator. The switching means has a second setting for transmitting signals indicative of the impedances of the geophone channels to the recording and computing system; this second setting disconnects the buses from ground and connects them to different output terminals of the generator so that the test signal is applied to the geophone channels substantially simultaneously. The switching means has a third setting for transmitting signals indicative of the common mode rejection of the geophone channels to the recording and computing system; the third setting disconnects both buses from ground and connects them to one of the output terminals of the generator and connects the other output terminal of the generator to ground.

Thus, the invention provides a relatively simple, efficient and inexpensive method and device for testing the impedances and common mode rejections of many geophone channels without the inconvenience, delays, and expenses associated with prior art methods and devices for conducting such tests.

The foregoing disclosure and description of the invention are illustrative and explanatory thereof, and various changes in the components, as well as in the details of the illustrated circuitry and the steps of operation, may be made within the scope of the appended claims without departing from the spirit of the invention.

I claim:

1. A seismic data gathering apparatus including:
  a signal recording and computing system, said system having a plurality of input channels;
  a plurality of geophone channels, each geophone channel having one or more geophones and a pair of wires, one high and one low, each wire being connected to the geophones and to an input channel of the recording and computing system, so that the voltage across each pair of wires is transmitted to said system;
  a high bus;
  an impedance for each high wire, said impedance being coupled to the high bus and to its high wire between the geophones and the recording and computing system;
  a low bus;
  an impedance for each low wire, said impedance being coupled to the low bus and to its low wire between the geophones and the recording and computing system;
  a signal generator for producing a test signal, said generator having a high output terminal and a low output terminal;
  switching means for selectively controlling the connections between the buses, the generator and ground, the switching means having a first setting connecting both buses to ground and disconnecting both buses from the generator, the switching means having a second setting disconnecting the buses from ground and connecting them to different output terminals of the generator so that the test signal is applied to the geophone channels substantially simultaneously, and the switching means having a third setting disconnecting both buses from ground and connecting them to one of the output terminals of the generator and connecting the other output terminal of the generator to ground,
  whereby the first setting will transmit the seismic signals developed by the geophones to the recording and computing system and the second setting will transmit signals indicative of the impedances of the geophone channels to the system and the third setting will transmit signals indicative of the common mode rejection of the geophone channels to the system.

2. The apparatus of claim 1, wherein the second setting of the switching means connects the high bus to the high output terminal and the low bus to the low output terminal and wherein the third setting of the switching means connects both buses to the high output terminal and connects the low output terminal to ground.

3. The apparatus of claim 2, wherein the connections between the buses, the impedances and the wires of the geophone channels are permanen.

* * * * *

UNITED STATES PATENT AND TRADEMARK OFFICE
CERTIFICATE OF CORRECTION

PATENT NO. : 4,276,619
DATED      : June 30, 1981
INVENTOR(S) : James E. Rickenbacker It is certified that error appears in the above—identified patent and that said Letters Patent is hereby corrected as shown below:

Col. 8, line 66, change "permanen" to-- permanent--.

Signed and Sealed this

Twentieth Day of October 1981

[SEAL]

Attest:

Attesting Officer

GERALD J. MOSSINGHOFF

Commissioner of Patents and Trademarks